United States Patent [19]

Hurlburt

[11] Patent Number: 5,312,123
[45] Date of Patent: May 17, 1994

[54] COMPOUND STEER CONVERSION APPARATUS

[75] Inventor: Joseph C. Hurlburt, Lancaster, Pa.

[73] Assignee: Ford New Holland, Inc., New Holland, Pa.

[21] Appl. No.: 974,640

[22] Filed: Nov. 12, 1992

[51] Int. Cl.$^5$ ............................................. B62D 1/00
[52] U.S. Cl. ........................................ 280/97; 280/98; 280/117; 180/156; 180/266
[58] Field of Search ................... 280/95.1, 97, 98, 85, 280/89, 109, 113, 117; 180/79.4, 144, 155, 156, 266, 267

[56] References Cited

U.S. PATENT DOCUMENTS

| | | | |
|---|---|---|---|
| 1,750,599 | 3/1930 | Holmes et al. | 280/89 |
| 3,370,670 | 2/1968 | Love | 180/79.2 |
| 5,046,577 | 9/1991 | Hurlburt | 280/97 |

FOREIGN PATENT DOCUMENTS

| | | |
|---|---|---|
| 1630721 | 8/1967 | Fed. Rep. of Germany . |
| 89/07545 | 8/1989 | PCT Int'l Appl. . |

Primary Examiner—Margaret A. Focarino
Assistant Examiner—Paul Dickson
Attorney, Agent, or Firm—Larry W. Miller; Frank A. Seemar

[57] ABSTRACT

A compound steering lock-out apparatus to be selectively used with a vehicle equipped with a compound steering mechanism in which the front steerable axle is pivotally connected to the vehicle chassis and a pair of tie rods extend between the pivotable wheels and the chassis to effect a pivotal movement of the axle upon the actuation of a pivotal movement of the wheels relative to the steerable axle. The lock-out apparatus includes a fastener engageable with pivotable components of the compound steering mechanism to restrict the pivotal movement of the carrier linkage interconnecting the axle and the chassis and a single conventional tie rod to replace the dual tie rod concept of the compound steering mechanism. The installation of the lock-out mechanism makes the compound steering apparatus operate as a conventional automotive-type steering mechanism.

15 Claims, 9 Drawing Sheets

COMPOUND STEER CONVERSION APPARATUS

BACKGROUND OF THE INVENTION

This invention relates generally to a steering mechanism for an agricultural tractor in which the front axle is laterally shiftable in response to a steering movement of the steerable wheels and, more particularly, to a compound steer lock-out apparatus that can be utilized to convert a compound steering mechanism to a conventional automotive-type steering mechanism.

Tractors, whether used in an agricultural setting or in an industrial setting, typically include a fixed axle through which primary driving power is transferred through fixed wheels rotatably mounted on opposing ends of the fixed axle, and a steering axle having pivotally mounted steerable ground engaging wheels rotatably mounted on the opposing ends thereof to support the chassis of the tractor above the ground. Supplemental driving power is often provided through the steerable ground engaging wheels, while a steering mechanism remotely controllable by the operator from the operator's compartment selectively controls the pivotal movement of the steerable wheels relative to the steering axle.

One such steering mechanism incorporates a transversely disposed, horizontally extending hydraulic cylinder supported by the steering axle and connected to the opposing steerable wheels. This hydraulic cylinder affects pivotal movement of the steerable wheels about their respective pivotal connections to the steering axle by manipulating the pressures in the hydraulic cylinder to effect a transverse displacement of cylinder rod, causing a turning of the wheels.

Due to physical limitations relating to the range of movement of the steering mechanism and to the eventual interference between the steerable wheels and the steering axle or chassis frame, the amount of pivotal movement of the steerable wheels relative to the steering axle is limited by tire size and track setting to a given restricted turning angle. This maximum turning angle defines the minimum turning radius of the tractor for a given chassis clearance width, axle oscillation angle, wheel base length and king pin spacing. The selection of the length of the wheel base, i.e., the distance between the fixed axle and the steering axle, is a compromise between the need to minimize the turning radius and, therefore, minimize the wheel base length, and to maximize ride considerations which require longer wheel base lengths.

These conflicting wheel base requirements can be better resolved by a steering mechanism incorporating a laterally shifting front axle that is movable in response to a corresponding steering movement of the steerable wheels, which will decrease the turning radius of the tractor for any given wheel base length. The mechanism mounting the steerable axle to the vehicle chassis must accommodate the relative lateral movement between the steering axle and the chassis and would preferably maintain the transversely extending axle in a parallel orientation as the axle and chassis move relative to one another in a generally horizontal plane.

The lateral movement of the shiftable axle is preferable automatically accomplished simultaneously and in conjunction with the steering movement imparted to the pivotable wheels by the steering mechanism. Furthermore, oversteering, which occurs when the wheels are pivoted at generally equal angles and, therefore, because of the lateral spacing of the wheels, do not end up with coinciding turning centers, is a problem with steering mechanisms that needs correction as the wheels are being steered.

It may be desirable by some operators to utilize a conventional automotive-type steering mechanism in some vehicle applications and the compound steering mechanism in other applications. Accordingly, it would be desirable to provide an apparatus for the compound steering mechanism that would be operable to lock-out the compound steering feature and convert the structure to operate as a conventional steering mechanism.

SUMMARY OF THE INVENTION

It is an object of this invention to overcome the aforementioned disadvantages of the prior art by providing a compound steering lock-out apparatus that can be operatively associated with the compound steering mechanism to convert the operation thereof to a conventional automotive-type steering mechanism.

It is another object of this invention to provide a steering mechanism that can be converted between compound steering features and a conventional automotive-type steering features.

It is an advantage of this invention that the conversion of a compound steering mechanism to a conventionally operating steering mechanism can be quickly and easily accomplished.

It is a feature of this invention that the compound steering conversion apparatus incorporates a single conventional tie rod to replace the pair of compound steering tie rods interconnecting the pivotal axle and the chassis at connection points offset from the longitudinal centerline of the chassis.

It is another feature of this invention that the pivotable components of the compound steering mechanism are interconnected by a fastener to prevent pivotal motion during turning movements to make the steering mechanism operate as a conventional automotive-type steering mechanism.

It is an advantage of this invention that the compound steering lock-out apparatus can be selectively installed and/or replaced to permit repeated conversions of the steering mechanism from compound steering to conventional steering.

It is another feature of this invention that the compound steering tie rods are connected to a plate detachably affixed to the chassis to permit an easy removal thereof.

It is still another object of this invention to provide a compound steering lock-out apparatus that can be packaged in a kit form for selective use as desired.

It is yet another object of this invention to provide a compound steering lock-out apparatus which is durable in construction, inexpensive of manufacture, carefree of maintenance, facile in assemblage, and simple and effective in use.

These and other objects, features, and advantages are accomplished according to the instant invention by providing a compound steering lock-out apparatus to be selectively used with a vehicle equipped with a compound steering mechanism in which the front steerable axle in pivotally connected to the vehicle chassis and a pair of tie rods extend between the pivotable wheels and the chassis to effect a pivotal movement of the axle upon the actuation of a pivotal movement of the wheels relative to the steerable axle. The lock-out apparatus includes a fastener engageable with pivotable components of the compound steering mechanism to restrict the pivotal movement of the linkage interconnecting the axle and the chassis and a single conventional tie rod to replace the dual tie rod concept of the compound steering mechanism The installation of the lock-out mechanism makes the compound steering apparatus operate as a conventional automotive-type steering mechanism.

BRIEF DESCRIPTION OF THE DRAWINGS

The advantages of this invention will become apparent upon consideration of the following detailed disclosure of the invention, especially when taken into conjunction with the accompanying drawings wherein.

DETAILED DESCRIPTION OF THE PREFERRED EMBODIMENT

Figure 1:
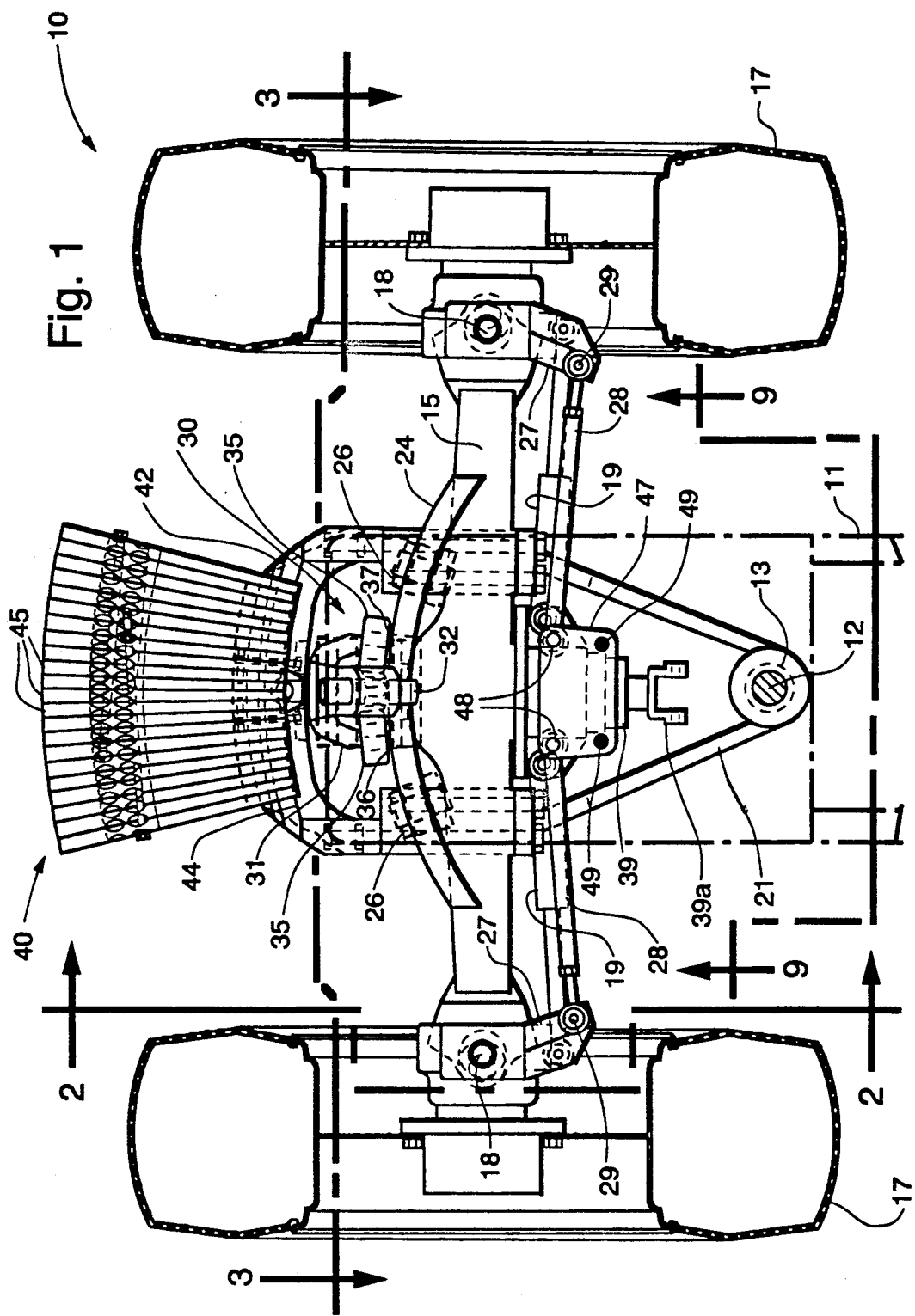
FIG. 1 is a top plan view of a front axle assembly for an agricultural tractor incorporating the principles of the instant invention, the front portion of the tractor chassis overlying the front axle assembly being shown in phantom.
Figure 2:
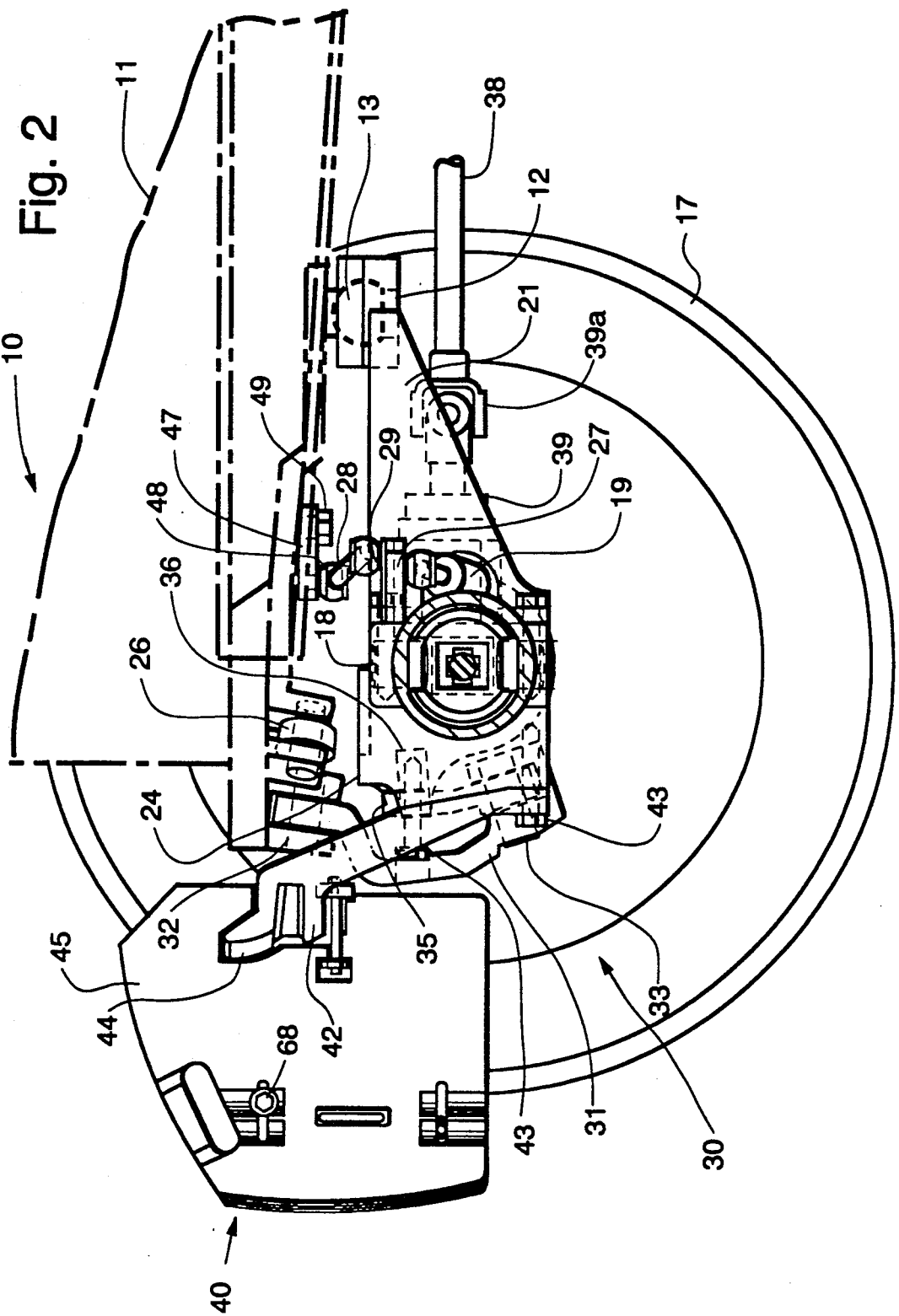
FIG. 2 is a cross-sectional view of the front axle assembly taken along lines 2—2 of FIG. 1, the front portion of the tractor chassis being shown in phantom relative to the front axle assembly.
Figure 3:
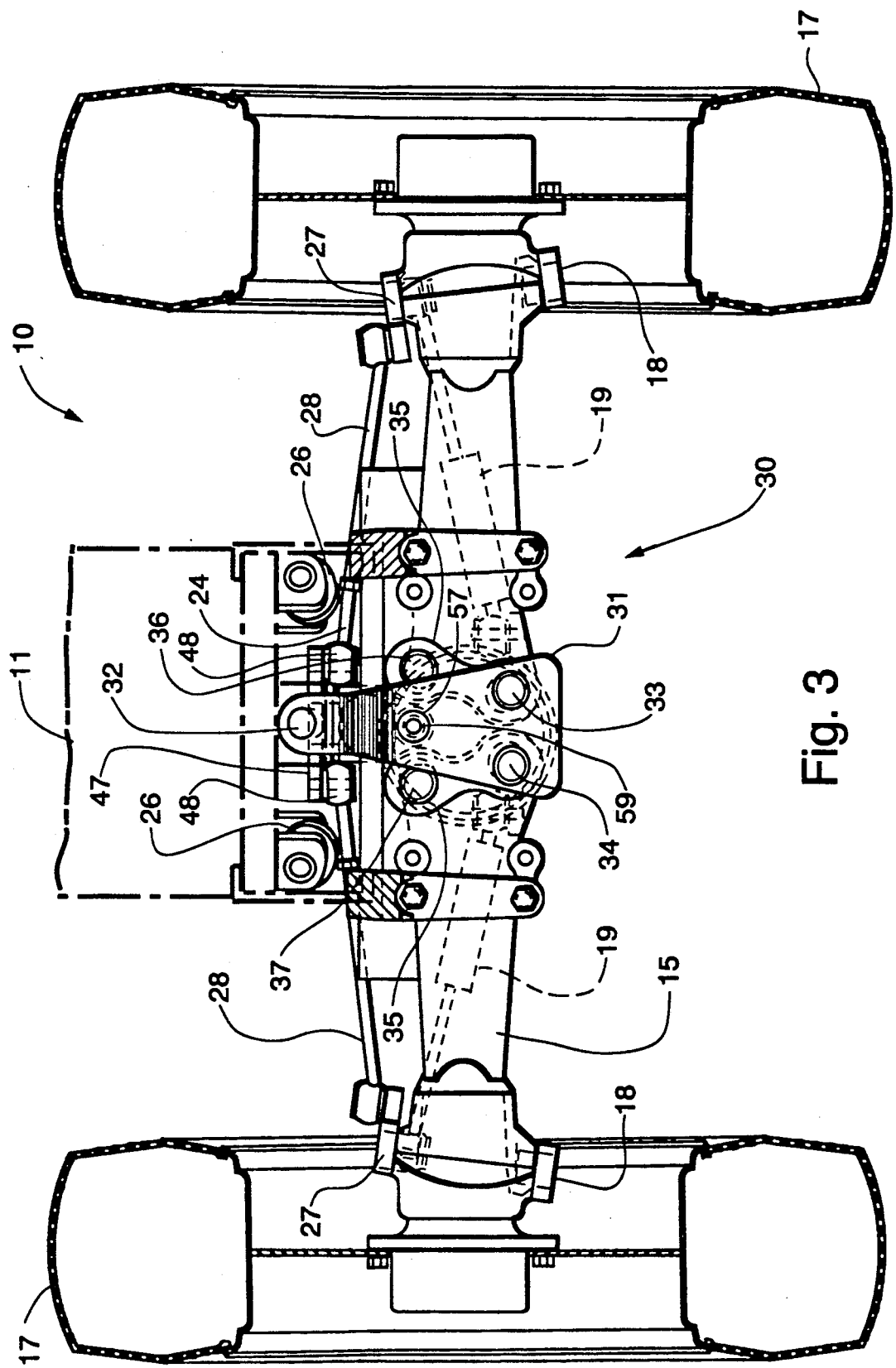
FIG. 3 is a cross-sectional view of the tractor front axle assembly taken along lines 3—3 of FIG. 1 to depict generally a front elevational view of the tractor assembly immediately rearwardly of the weights.

Referring now to FIGS. 1-3, a laterally shifting front axle assembly for an agricultural tractor or other vehicle, pivotally connected to the vehicle chassis to provide a decreased turning radius for an given wheel base, can best be seen. The front axle assembly 10 is pivotally connected to the tractor chassis 11 for pivotal movement about a generally vertical axis 12, thereby allowing the front axle assembly 10 to rotate about the pivot axis 12 and shift the front axle assembly 10 laterally relative to tractor chassis 11. The pivot axis 12 employs a spherical ball joint 13 to permit some oscillatory movement of the front axle 15 relative to the chassis 11. The details of a laterally shiftable front axle assembly to provide better turning capabilities is described in detail in U.S. Pat. No. 5,046,577 issued on Sep. 10, 1991 to Joseph C. Hurlburt, the description of which is incorporated herein by reference.

The front axle assembly 10 includes a transversely extending axle member 15 having pivotally mounted on the respective laterally opposing ends thereof a pair of steerable wheels 17 pivotable about respective nearly vertical king pin axes 18 to effect a steering of the wheels 17 relative to the axle member 15. A pair of hydraulic cylinders 19 interconnect the axle member 15 and the steerable wheels 17 via a steering arm 27 to control the pivotable movement of the wheels 17 relative to the axle member, and thereby, effect steering.

The front axle member 15 carries a rearwardly extending subframe member 21 which carries the vertical pivot 12 and ball joint 13 connected to the tractor chassis 11 rearwardly of the front axle member 15 yet generally positioned laterally between the front steerable wheels 17. A front yoke assembly 30 suspends the laterally shiftable front axle member 15 from the forward end of the tractor chassis 11 to permit a pivotal movement of the front axle assembly 10 relative to tractor chassis 11 about the vertical axis 12. To facilitate relative movement between the front axle assembly 10 and the tractor chassis 11 when the axle is fully oscillated, the front axle member 15 is also provided with an arcuate track 24 having a center of curvature essentially coincident with the pivot axis 12. The chassis 11 carries a pair of laterally spaced rollers 26 that are engageable with the arcuate track 24 when the front axle member 15 oscillates about a generally horizontal axis in response to changing ground contours and undulations so that the rollers 26 provide a limit to the vertical movement of the front axle member 15 relative to the tractor chassis 11 due to an engagement thereof with the arcuate track 24.

A pair of tie rods 28 interconnecting the chassis 11 and the steerable wheels 17 transmit coordinated steerable movement of the wheels 17 relative to each other and to the front axle member 15 and to a lateral shifting movement of the chassis 11 relative to the front axle 15. Although the front axle 15 is pivotally connected to the chassis 11, the front axle 15 is engaged with the ground through the wheels 17 and the actual pivotal movement results in a lateral shifting of the chassis 11. Looking at the front axle 15 from the reference frame of the chassis 11, the appearance is that the axle 15 shifts relative thereto and any reference hereinafter describing the pivotal movement of the front axle member 15 relative to the chassis is so described.

Because of the fixed length of each respective tie rod 28 interconnecting the chassis 11 and the wheels 17 at a connection point 29 spaced inwardly toward the center of the chassis 11 and rearwardly from the respective pivot axis or king pin 18 for the corresponding steerable wheel 17 by a rearwardly and inwardly extending steering arm 27, a pivotable movement of the wheel 17 about the corresponding pivot axis 18 will result in a corresponding shifting of the front axle 15 relative to the center (not shown) of a tractor chassis 11, along which the vertical pivot axis 12 is positioned.

Figure 4:
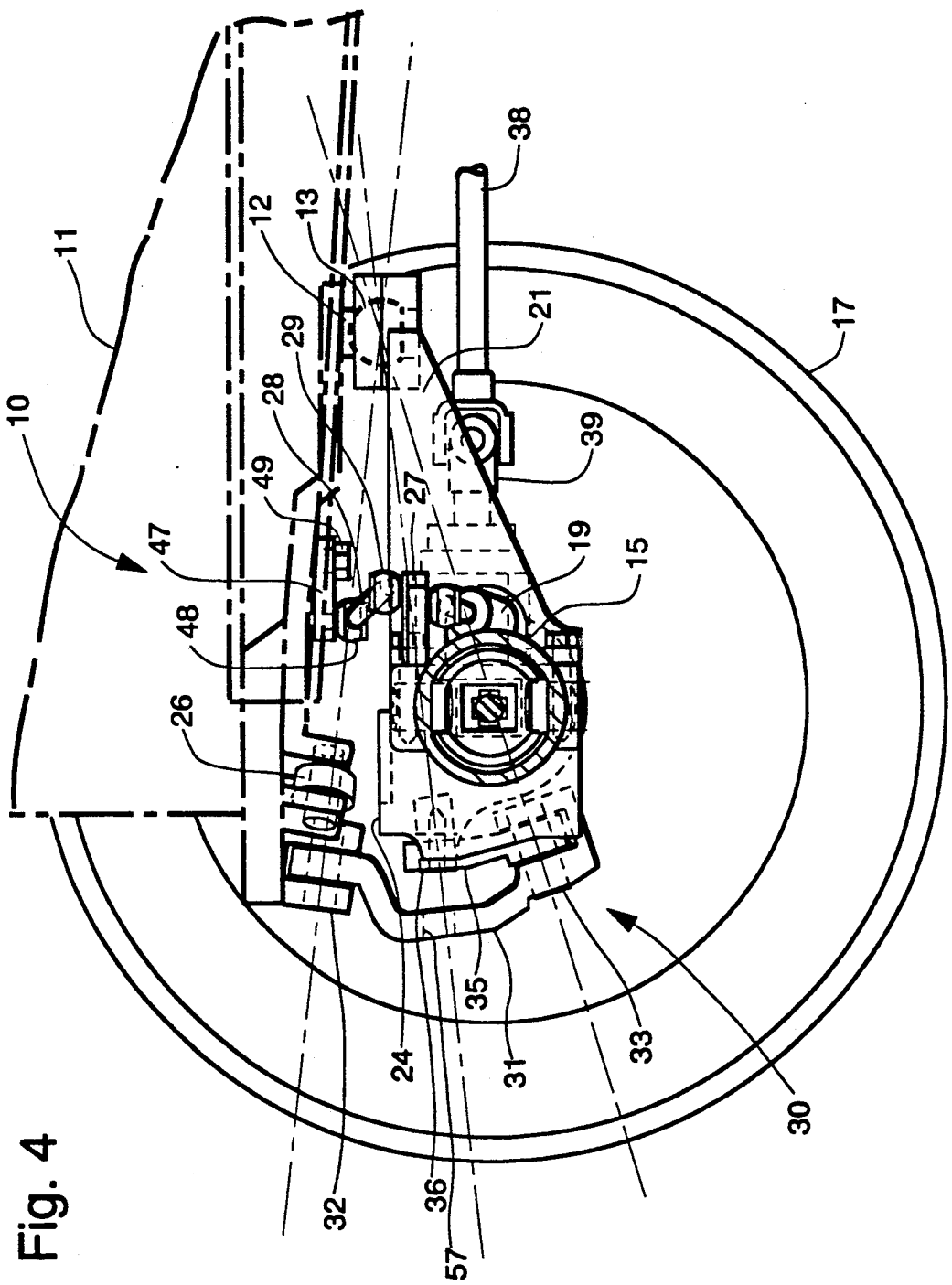
FIG. 4 is a cross-sectional view of the front axle assembly similar to FIG. 2, but with the front ballast assembly removed to better depict the linkage pivotally interconnecting the steerable axle and the vehicle chassis.

The front yoke assembly 30 has a contoured front carrier member 31 pivotally connected at a second pivot joint 32 to the chassis 11. The front carrier member 31 also carries a pair of transversely spaced third and fourth lower pivots 33, 34, respectively, for pivotally supporting a corresponding pair of dog bone-shaped links 35 which, in turn, are pivotally connected to the front axle member 15 by respective transversely spaced fifth and sixth pivots 36, 37. As depicted in FIG. 4, each of the pivots 32, 33, 34, 36 and 37 associated with the front yoke assembly 30 have a corresponding pivot axis aligned with the ball joint 13, which is located on the pivot axis 12. Accordingly, the pivot axis for each of the five pivots 32, 33, 34, 36 and 37 have a nonparallel relationship intersecting a common point at the center of the ball joint 13.

As a result, the pivotal movement of the front axle assembly 10 relative to the tractor chassis 11, resulting in a lateral shifting of the front axle member 15, is accomplished through a four-bar linkage which has very little vertical component associated with the movement thereof, yet the chassis 11 maintains a substantially uniform elevation relative to the front axle 15 throughout the range of relative movement between the front steerable axle and the vehicle chassis.

The main pivot axis for lateral shifting and vertical oscillatory movement of the front axle 15 is the axis defined by the second pivot joint 32 extending through the ball joint 13, as both the pivot 32 and the ball joint 13 are fixed relative to the chassis 11. The generally transverse lines defined by the tie rods 28 extend through this main pivot axis extending through pivot 32 and ball joint 13 so that movements of the axle 15, especially oscillatory movements, causes a minimum additional steering effect to the axle 15.

As depicted in FIGS. 1-3, the front axle assembly 10 may be powered in a conventional manner from the transmission (not shown) carried by the tractor chassis 11 through the front wheel drive shaft 38 connected to a conventional front wheel drive mechanism 39 to operatively power the rotation of the steerable wheels 15 to facilitate movement of the tractor chassis 11 over the ground One skilled in the art will readily realize that the provision of a front wheel drive mechanism 39 is optional and independent of the operation of the compound steering mechanism permitting a lateral shifting of the tractor chassis 11 relative to the front axle member 15. The continuous driving of the front wheels 17 during steering operation involving a lateral shifting of the tractor chassis 11 relative to the front axle member 15 can be accommodated by the universal joint 39a interconnecting the front wheel drive mechanism 39 and the drive shaft 38.

The tractor ballast assembly 40 is carried by the front axle assembly 10 intermediate of the steerable wheels 17 at a position centrally therebetween. A carrier 42 is detachably connected by fasteners 43 to the front axle member 15 to extend forwardly thereof and forwardly of the tractor chassis 11, as well. The carrier 42 is provided with an arcuate mounting ring 44 upon which individual suitcase weights 45 are supported. Since the carrier 42 moves with the front axle member 15 relative to the chassis 11, the position of the ballast assembly 40 relative to the laterally spaced front wheels 17 remains relatively fixed, thereby maintaining a substantially constant weight distribution relative to the front wheels 17. Furthermore, since the ballast assembly 40 moves with the axle member 15, the steering clearance between the pivotally movable wheels 17 and the ballast assembly 40 does not change as the front axle 15 shifts laterally and/or oscillates vertically. As a result, the operator may mount additional weight units 45 to increase the amount of ballast on the front axle 15 without decreasing the tire clearance below that which is acceptable for traditional tractors. Greater detail in the construction and assemblage of the individual weights 45 to form the ballast assembly 40 can be found in copending U.S. Pat. No. 5,219,180, issued to Randall E. Zipser, et al, on Jun. 15, 1993, the descriptive portions of which are incorporated herein by reference.

The configuration of the components of the front yoke assembly 30, chassis 11 and front steerable axle 15, as the tractor steering mechanism 19 effects a turn of the tractor chassis 11, is best seen in FIGS. 5-8. The dog-bone link members 35 diverge upwardly so that the fifth and sixth pivot joints are transversely spaced further apart than the third and fourth lower pivot joints to provide a nearly parallel planar motion of the chassis 11 relative to the axle 15 and an increased measure of stability to the assembly 30. A turning of the steerable wheels 17, as exemplified by the right turn depicted in FIGS. 6 and 8, causes a corresponding relative shifting between the steerable axle 15 and the chassis 11, which in the frame of reference of the chassis 11 causes a shifting of the axle 15 in the direction of the intended turn. As described above, this relative shifting of the axle 15 shortens the turning radius and allows the tractor to make a tighter turn.

Figure 6:
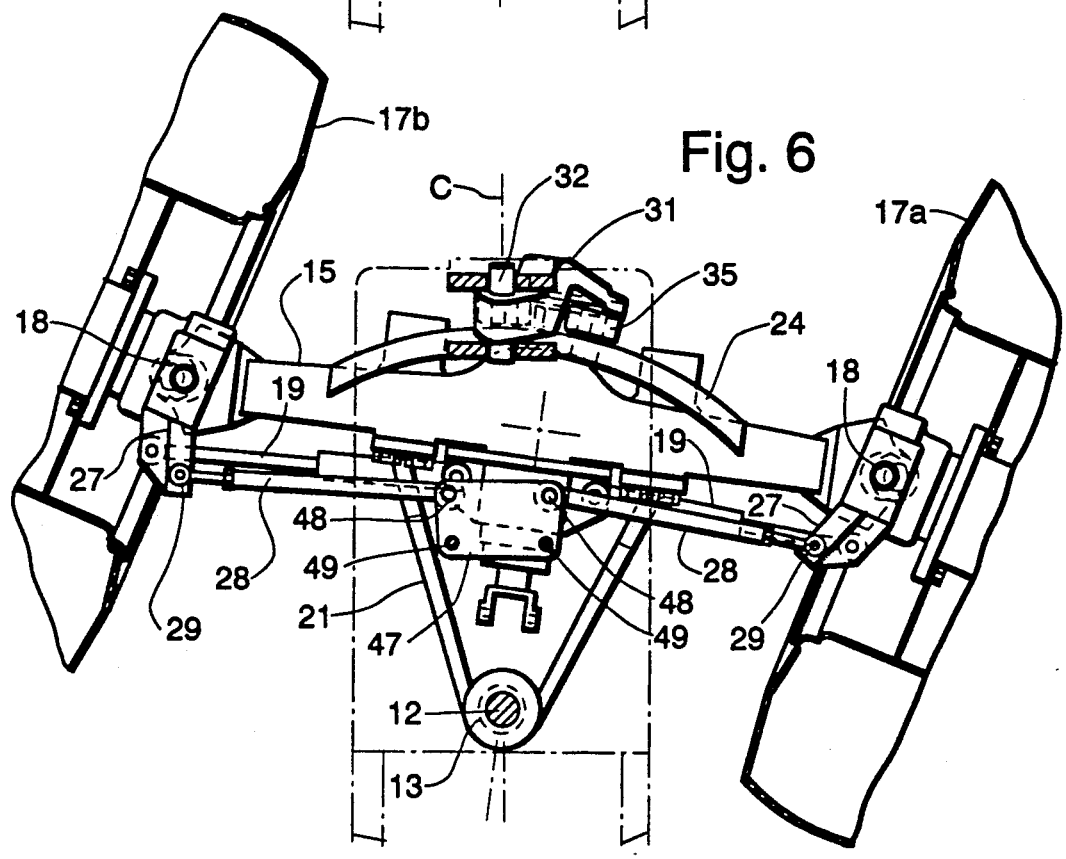
FIG. 6 is a top plan view of the front axle assembly similar to the view of FIG. 5 but with the steerable axle and steerable wheels moved to effect a right turn of the vehicle.
Figure 7:
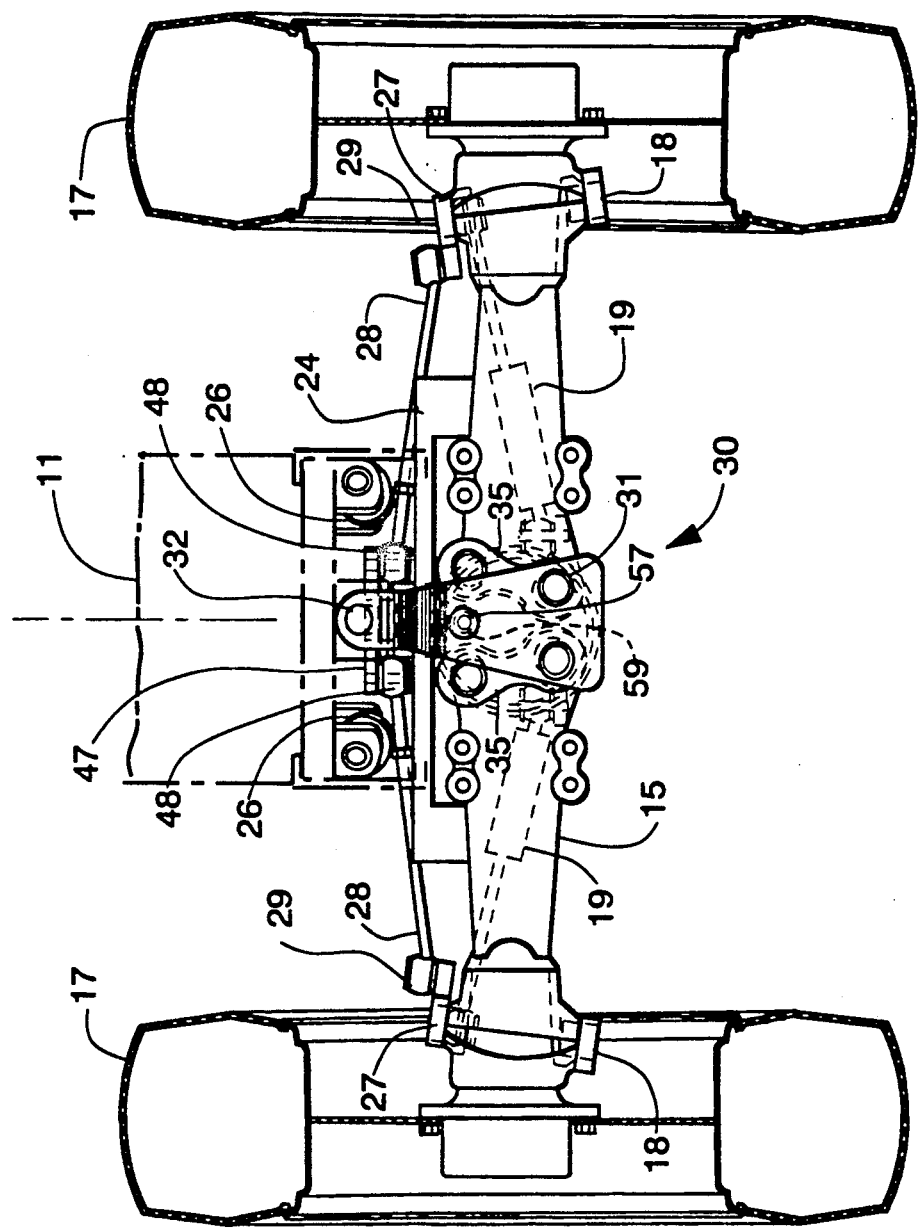
FIG. 7 is a front elevational view of the tractor front axle assembly similar to the view of FIG. 3, but with the front ballast assembly removed for purposes of clarity.
Figure 8:
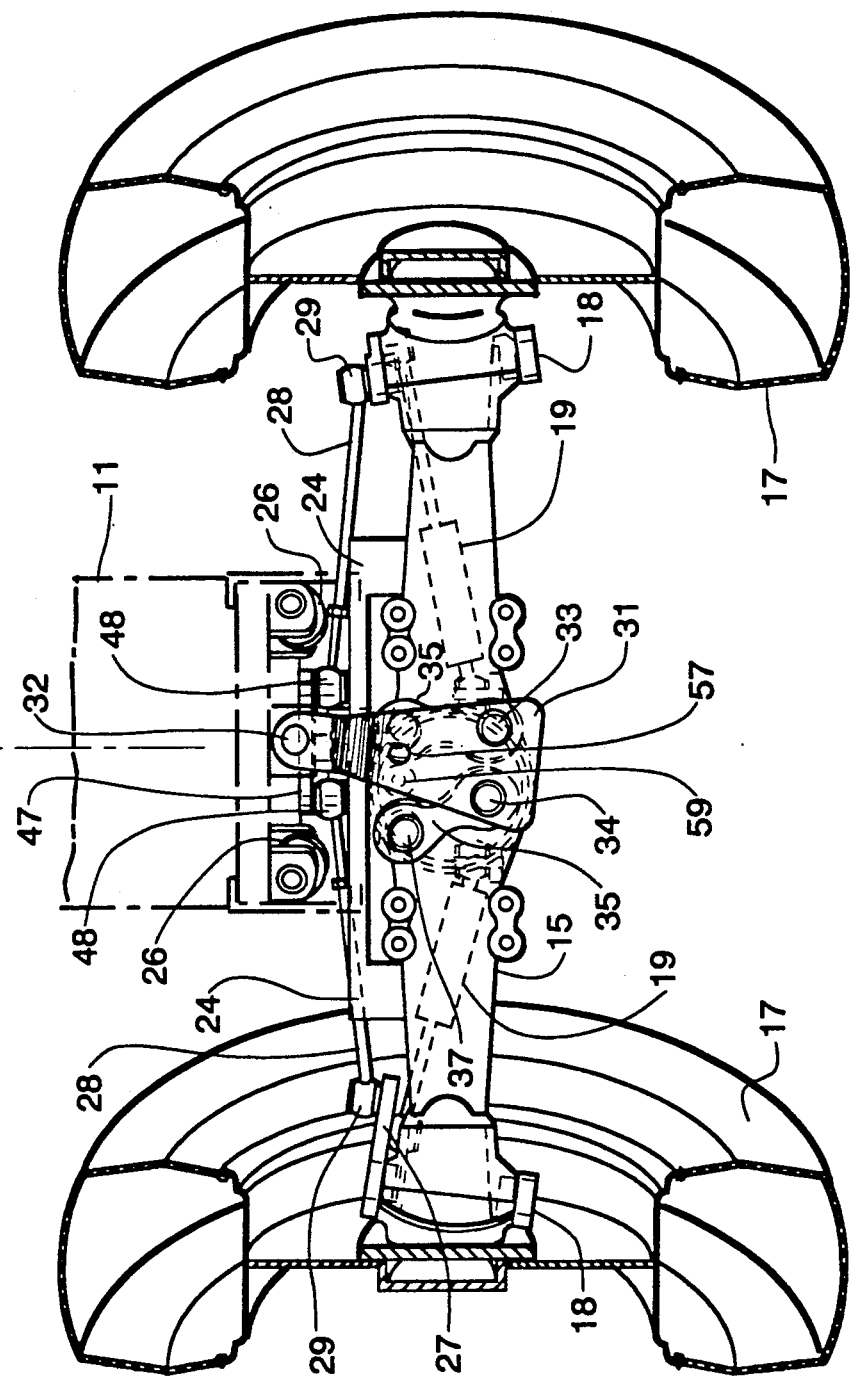
FIG. 8 is a front elevational view of the front axle assembly similar to the view of FIG. 7, but with the steerable axle and steerable wheels moved to effect a right hand turn of the vehicle as depicted in FIG. 6.
Figure 9:
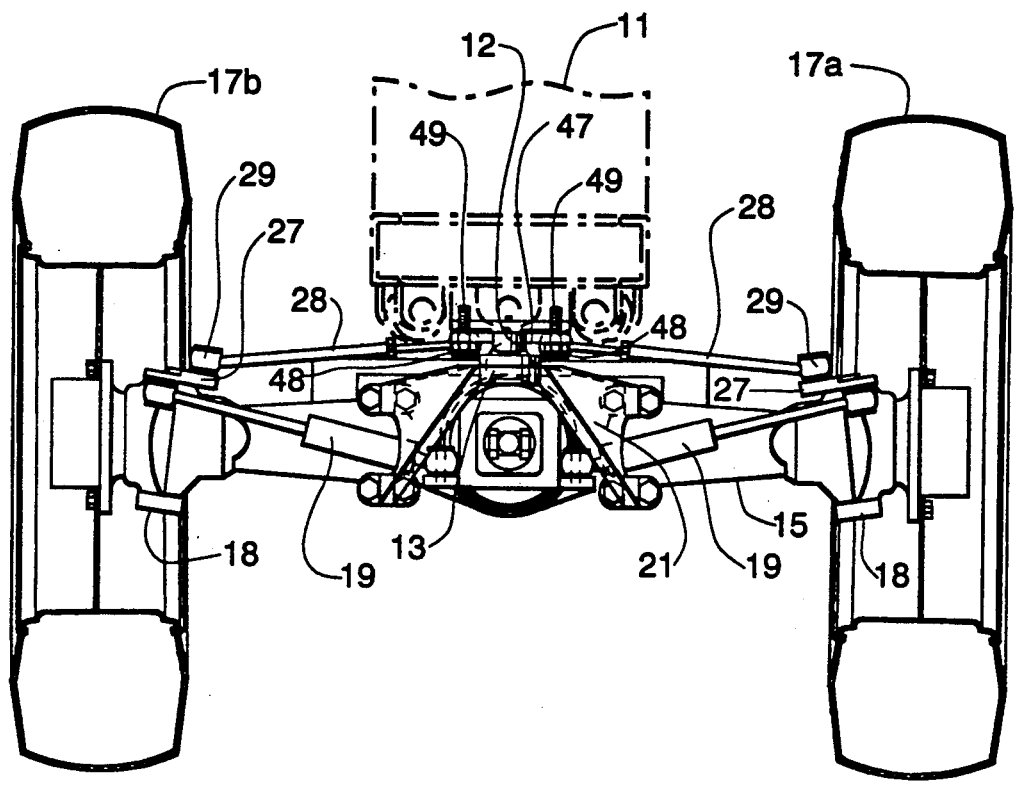
FIG. 9 is a rear elevational view of the front axle assembly taken along lines 9—9 of FIG. 1 with the front ballast assembly removed for purposes of clarity and the chassis being shown in phantom.

During such a turn, the tie rods 28 force the chassis 11 in the opposite direction from which the turn is being made, which in the frame of reference of the chassis 11 causes a relative movement of the axle 15 about the first pivot axis 12 into the direction of the turn being made. When the axle 15 moves relative to the chassis 11, the carrier member 31 pivots about its pivotal connection 32 with the chassis 11, as shown in FIGS. 6 and 8, swinging the third and fourth lower pivots 33, 34 and the connected dog-bone link members 35 toward the direction the turn is being made. Because of the configuration of the four pivots 33, 34, 36 and 37 associated with the two link members 35, the fifth and sixth upper pivots 36, 37 swing toward the direction of the turn in a parallel orientation to which they were centrally positioned. As a result, the vertical movement of the axle 15 relative to the chassis 11 is minimized during turns. The disclosed assembly 30 has been found to result in a lowered elevational change of the chassis 11 of approximately a quarter of an inch during turns, and during this minimal vertical movement, the chassis 11 remains in a parallel orientation with respect to its position prior to the turn.

The spherical ball joint 13 at the first pivot 12 accommodates any limited vertical movement of the axle 15 relative to the chassis 11 and allows oscillatory or lateral pitching movement of the axle 15 relative to the chassis 11 about the pivot 32. This oscillatory movement of the axle 15 can cause greater pivotal movement of the carrier member 31 about the pivot 32 than is shown in FIGS. 6 and 8. This particular configuration of components pivotally mounting the axle 15 to the chassis 11 for relative lateral movement results in a minimum of elevational changes for the chassis, irrespective of the movement of the axle 15, which in turn provides the ability to utilize front mounted attachments for the chassis 11 without affecting their operation during turns. Furthermore, the respective tie rods 28 are oriented such that the inwardly extending line of each of the tie rods 28 from the connection point 29 will intersect with the pivot axis extending between the pivot joint 32 and the center of the ball joint 13. This orientation of the tie rods 28 minimizes any steering effect to the wheels 17 whenever the axle 15 oscillates relative to the chassis 11.

The centering of all the pivot axes associated with the pivot joints 32, 33, 34, 36 and 37 at the center of the ball joint 13 allows the unrestricted pivotal movement of the carrier member 31 and the dog-bone link members 35 during the turning movements and for oscillatory or pitching movements as well, without requiring additional motion components to be accommodated during the relative movement of the axle 15 and the chassis 11. It will be understood by one skilled in the art that the specific orientation of these respective pivots 32, 33, 34, 36 and 37 requires the formation of a specially formed carrier member 31 and dog-bone members 35 to orient properly the respective pivots. Furthermore, the carrier member 31 has a somewhat arcuate shape to bow out around the dog-bone members 35 for their unrestricted movement between the carrier member 31 and the axle 15.

As best seen in FIGS. 1, 5-7, and 9, the opposing tie rods 28 are pivotally connected at chassis connection points 48 to a plate 47 detachably affixed to the chassis 11 by fasteners 49 in a manner centered on the longitudinal centerline C of the chassis 11 rearwardly of the axle 15. The chassis connection points 48 are offset laterally from the chassis centerline C and, as the pivot connection points 29, are formed as ball joints to accommodate universal movement of the tie rods 28. Any pivotal movement of the axle 15 relative to the chassis 11 will also be relative the plate 47 which is detachably affixed to the chassis 11.

Since the interior chassis connection points 48 are fixed to the chassis 11, the stroking of the hydraulic cylinders 19 to pivotally rotate the opposing wheels 17 about their respective king pins 18 results in pivotal movement of the axle 15 about the pivot axis 12, in the manner described above, because of the fixed distance between the chassis connection point 48 and the corresponding pivot connection point 29 imposed by the respective tie rods 28. Accordingly, the tie rods 28 being fixed between the wheels 17 and the chassis 11 effect the relative pivotal movement between the axle 15 and the chassis 11 to improve the steering characteristics.

Figure 5:
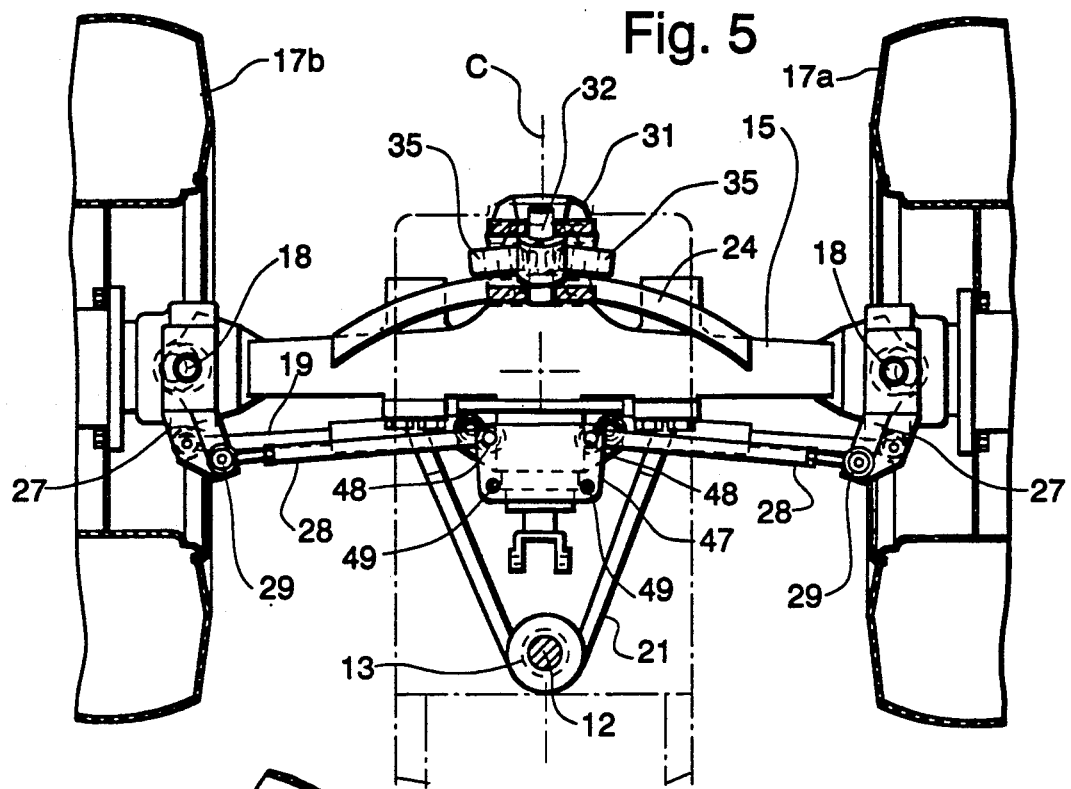
FIG. 5 is a top plan view of the front axle assembly similar to the view of FIG. 1, but with the front ballast assembly removed for purposes of clarity.

Referring specifically to the top plan views of the front axle assembly shown in FIGS. 5 and 6, one skilled in the art will readily see that the linear distance between the respective pivot connection points 29 for the tie rods 28, when the chassis is being directed in a straight longitudinal direction as depicted in FIG. 5, is a given distance. The pivotal rotation of the axle 15 relative to the plate 47, as representatively depicted in FIG. 6, results in a shortening of this linear distance between the respective pivot connection points 48.

This shortening of the linear distance between respective pivot connection points 29 can be visualized from the reference point of the axle 15 looking at the plate 47. From this orientation, the pivotal movement of the axle 15 about the pivot axis 12 appears to result in a rotation of the plate 47 and a corresponding relative toggling of the tie rods 28. This toggling of the tie rods 28 results in a physical shortening of the linear distance between the respective pivot connection points 29.

Looking then at the inside wheel 17a from the perspective of the outside wheel 17b during a turning movement, which as representatively depicted in FIG. 6 would be to look at the right wheel 17a from the perspective of the left wheel 17b, this shortening of the linear distance between the respective pivot connection points 29 increases the relative pivotal movement of the inside wheel 17a to correct the oversteering problem. The amount of shortening of this linear distance between respective pivot connection points 29 is a function of the normal linear distance between the pivot connection points 29 and the distance the chassis connection points 48 are offset from the longitudinal centerline C of the chassis. One skilled in the art would readily realize that the placement of the chassis connection points 48 on the longitudinal centerline C would result in no shortening of the linear distance between the pivot connection points 29 as the axle 15 pivots relative to the chassis 11.

The amount of offset of the chassis connection points 8 from the longitudinal centerline C of the chassis 11 needs to be carefully chosen to result in the proper amount of differential pivotal movement of the wheels 17 as the axle 15 rotates about the pivot 12 to keep the turn centers of the respective wheels 17a, 17b coincidental, thereby correcting oversteering problems automatically as the vehicle executes a turning movement. It is anticipated that some operators may want to use the operational advantages of the compound steering mechanism 10 in some circumstances, but would prefer to use a conventional automotive-type steering mechanism in other situations.

Figure 10:
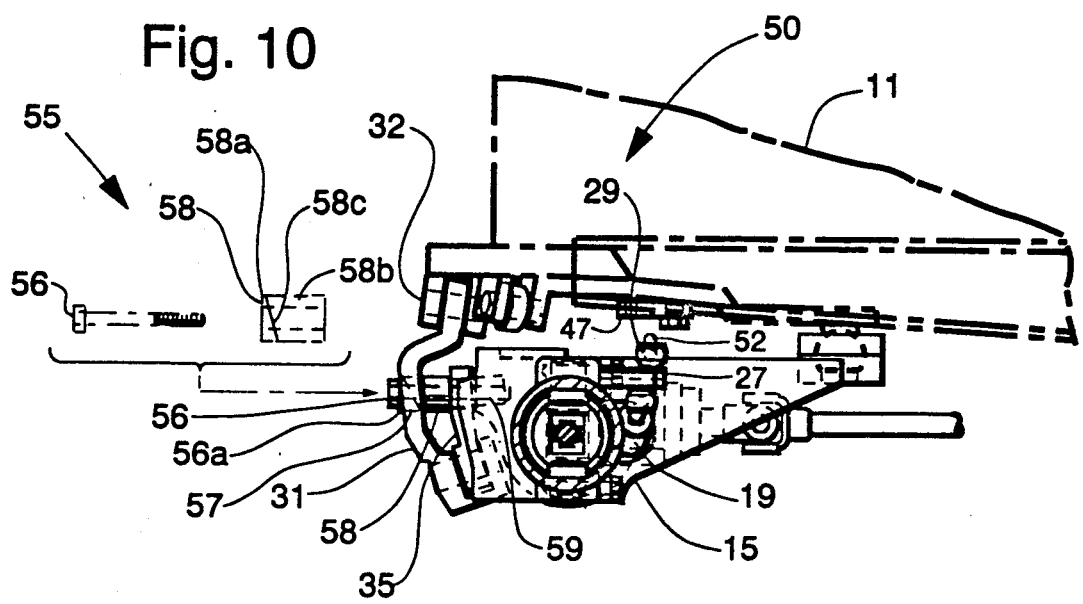
FIG. 10 is a partial side elevational view of the front axle assembly similar to the view depicted in FIG. 4, but with the steerable wheels removed and with the lock-out apparatus installed to convert the compound steer into a conventionally operable steering mechanism, the lock-out bolt assembly being shown in an exploded view in phantom.
Figure 11:
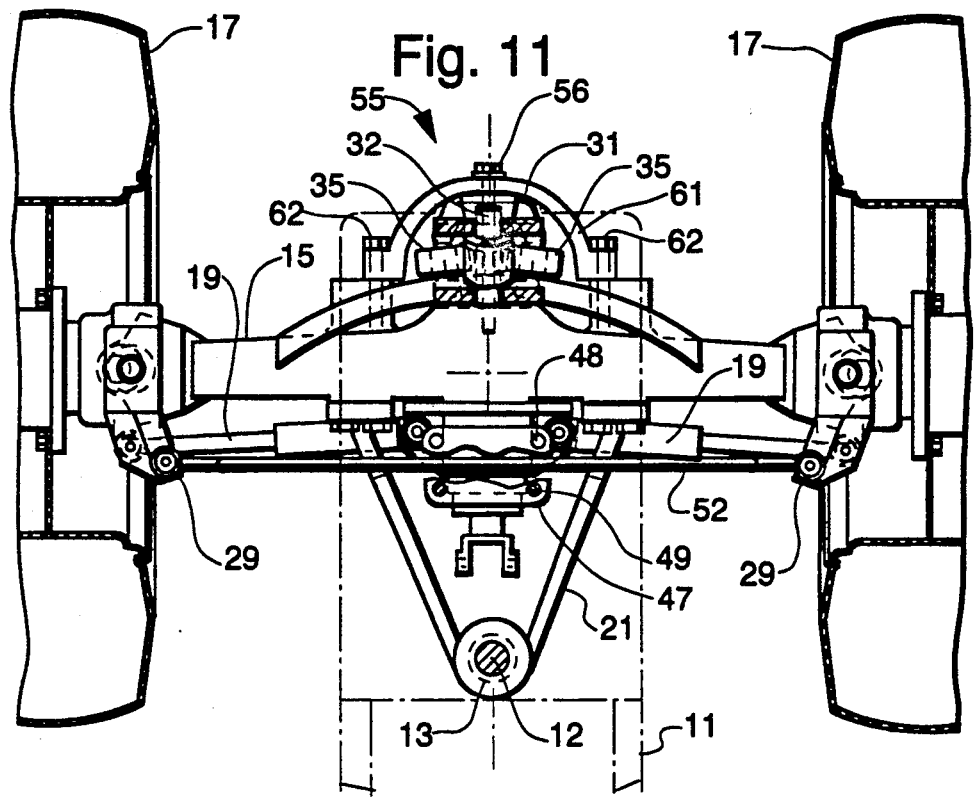
FIG. 11 is a top plan view of the front axle assembly shown in FIG. 10 with an alternative embodiment of the lock-out apparatus installed to convert the compound steer into a conventionally operable steering mechanism.
Figure 12:
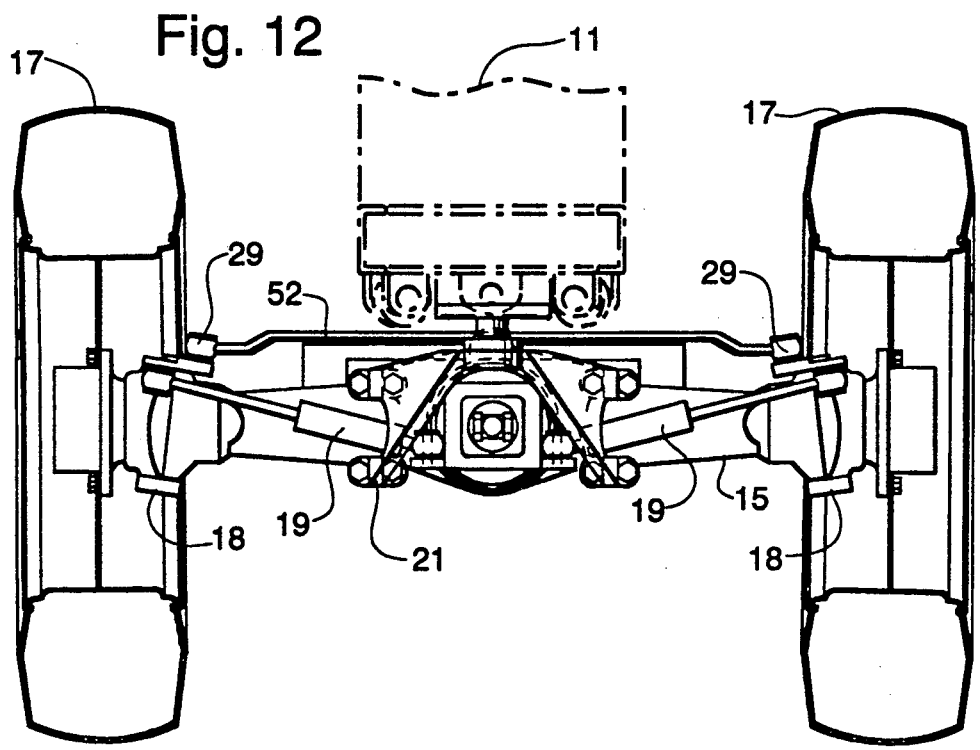
FIG. 12 is a rear elevational view of the front axle assembly shown in FIG. 10.

Referring now to FIGS. 10-12, the lock-out apparatus 50, which when installed will convert the compound steering mechanism 10 into a conventionally operating steering mechanism, can best be seen. The lock-out apparatus 50 comprises a single tie rod 52 and a lock-out bolt assembly 55, which when installed as described in greater detail below will prevent relative pivotal movement between the axle 15 and the chassis 11.

The lock-out bolt assembly 55 includes a fastener 56 and a split hub 58. The hub 58 is split into two halves 58a, 58b which mate along a diagonal line. The outer circumference of the hub 58 is slightly smaller than the inner circumference of a longitudinally extending opening 57 through the carrier member 31, which is alignable with a threaded hole 59 in the axle 15 when the axle 15 is perpendicular to the longitudinal centerline C of the chassis 11 and corresponds to a straight ahead direction of travel. The opening 57 and hole 59 and the alignment therebetween can be seen in a comparison of FIGS. 7 and 8.

The fastener 56 is insertable through the split hub 58, which has a length to extend between the opening 57 in the carrier 31 and the hole 59 in the axle 15, while the fastener 56 can be threaded into the hole 59. If an appropriate boss is not formed in the uniquely shaped carrier member 31, a tapered washer 56a would have to be provided to secure a uniform clamping load on the carrier member 31. When the hub 58 is positioned in the carrier member 31 and in the axle 15 with the diagonal mating faces 58c aligned, the threaded fastener 56 can be inserted therethrough and threaded into the hole 59 to exert a clamping load on the split hub 58, which will cam along the diagonal mating surface 58c to fill the opening 57 and firmly lock the carrier member 31 into a fixed position relative to the axle 15. As a result, the front yoke assembly 30, forming the carrier linkage pivotally connecting the axle 15 to the chassis 11, cannot pivotally move to effect a steering movement of the axle 15 about the vertical pivot axis 12.

An alternative embodiment of the lock-out apparatus 50 is depicted in FIG. 11. Instead of the lock-out bolt assembly 55, as described relative to the exploded view of FIG. 10, the fastener 56 attaches a U-shaped bracket 61 to the front carrier member 31, while additional fasteners 62 connect the bracket 61 to the axle 15. As a result, the front carrier member 31 is again prevented from pivotal movement of the axle 15 relative to the chassis 11, which is essential to the conversion of the compound steering mechanism 10 into a conventionally operating steering mechanism.

To complete the conversion of the compound steering mechanism 10 to a conventionally operating steering mechanism, the dual tie rods 28 interconnecting the chassis 11 and the steering arms 27 of the respective wheels must be replaced with a single conventional tie rod 52 spanning the linear distance between the respective pivot connection points 29. This conversion can be fairly easily accomplished by removing the fasteners 49 fixing the plate 47 to the chassis 11, or just disconnecting the chassis connection points 48 from the plate 47, disconnecting the remote ends of the tie rods 28 at the pivot connection points 29, and replacing the pivot connection points 29 to fasten the single tie rod 52 therebetween.

As best seen in FIGS. 11 and 12, the pivotal movement of the wheels 17 actuated by the operation of the hydraulic cylinders 19 and the cross-connection of the single tie rod 52 cannot effect any relative pivotal movement between the axle 15 and the chassis 11 because there is no action urging such a motion and, furthermore, the locking of the carrier member 31 to the axle 15 prevents any lateral shifting of the axle 15 relative to the chassis 11. Therefore, the only steering action must come from a conventional turning of the wheels 17 relative to the axle 15. Since the king pins 18 and steering arms 27 are oriented in a conventional manner, the oversteering problem is conventionally corrected. A simple removal of the lock-out bolt assembly 55 and a replacement of the single tie rod 52 with the plate 47 and attached dual tie rods 28 returns the axle assembly 10 to a compound steering mechanism.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A method of converting a steering mechanism from a compound steering mechanism, in which an axle pivotally mounting a pair of opposing steerable wheels is laterally movable relative to a chassis from which said axle is supported by a pivotable linkage in response to a pivoting of the steerable wheels which are operatively connected to said chassis, to a conventionally operating steering mechanism, in which the steering of said chassis is accomplished solely through the pivotal movement of said wheels relative to said axle, comprising the steps of:

locking said axle against the chassis to prevent relative pivotal movement through therebetween; and removing the operative connection between said wheels and said chassis to eliminate the actuation of the pivotal movement of said axle relative to said chassis and interconnecting said steerable wheels to allow pivotal movement thereof relative to said axle in a conventional simple steering operation.

2. The method of claim 1 wherein said locking step includes the step of:

restraining said linkage from pivoting relative to said axle.

3. The method of claim 2 wherein said restraining step includes the steps of:

installing a hub between said linkage and said axle; and inserting a fastener through said hub to clamp said linkage to said axle.

4. The method of claim 3 wherein said installing step includes the steps of:

positioning a first split hub half having a first diagonal mating face into said linkage; and positioning a second split hub half having a second diagonal mating face in said linkage with said second mating face being oriented in a mating fashion against said first mating face.

5. The method of claim 4 wherein said inserting step further includes the step of:

threading said fastener into said axle to draw said first and second split hub halves together along said mating faces.

6. The method of claim 2 wherein said restraining step includes the step of:

detachably connecting a bracket to said linkage and to said axle to prevent relative pivotal movement therebetween.

7. The method of claim 2 wherein said removing and interconnecting step includes the step of:

replacing a connecting linkage between said wheels and said chassis causing a pivotal movement of said axle upon a corresponding pivotal movement of said wheels with a tie rod directly interconnecting said opposing wheels.

8. An apparatus for converting a compound steering mechanism having a laterally shiftable steerable axle pivotally supported from a chassis by a carrier linkage to permit lateral movement of said steerable axle relative to said chassis, said steerable axle being provided with steerable wheels pivotally connected thereto, and a connecting link assembly interconnecting said steerable wheels and said chassis to effect relative lateral movement between said steerable axle and said chassis upon pivotal steering movement of said steerable wheels, to a conventionally operating steering mechanism, in which a directional turning of said chassis is accomplished solely through said pivotal steering movement of said steerable wheels without an associated relative pivotal movement between said steerable axle and said chassis, comprising:

a lock-out apparatus interengaged between laterally shiftable steerable axle and said carrier linkage to prevent pivotal movement of said carrier linkage associated with the lateral shifting of said steerable axle relative to said chassis; and a tie rod interengaged between opposing steerable wheels to effect simultaneous movement therebetween, said tie rod being a replacement for said connecting link assembly to eliminate the interconnection between said steerable wheels and said chassis.

9. The apparatus of claim 8 wherein said lock-out apparatus includes a lock-out bolt assembly comprising:

a split hub having first and second halves provided with a diagonal mating faces; and a fastener inserted through said split hub halves to extend between said carrier linkage and said axle and prevent any pivotal motion therebetween.

10. The apparatus of claim 8 wherein said lock-out apparatus includes a bracket detachably connected to both said carrier linkage and said axle to prevent any pivotal motion therebetween.

11. In a vehicle including a chassis having a generally longitudinally extending centerline; a transversely extending steerable axle pivotally mounted to said chassis for lateral movement relative to said chassis about a generally vertically extending axis; a carrier linkage pivotally supporting said steerable axle from said chassis; a pair of opposing steerable wheels pivotally connected to the respective transverse ends of said steerable axle for pivotal movement relative thereto about respective wheel pivot axes; steering means operatively connected to said steerable wheels to control the pivotal movement thereof relative to said steerable axle; and a connecting link means operatively associated with said steerable wheels to effect a lateral shifting of said steerable axle in response to a pivotal movement of said steerable wheels, the improvement comprising:

a lock-out means for selectively engaging said axle to prevent any lateral shifting thereof relative to said chassis without restricting the selective pivotal movement of said steerable wheels relative to said axle to accomplish a steering operation of said vehicle.

12. The vehicle of claim 11 wherein said lock-out means includes:

a lock-out bolt assembly interengaged between said carrier linkage and said axle to prevent pivotal movement of said carrier linkage associated with the lateral shifting of said steerable axle relative to said chassis.

13. The vehicle of claim 12 wherein said lock-out bolt assembly comprises:

a split hub having first and second halves provided with diagonal mating faces; and a fastener inserted through said split hub halves to extend between said carrier linkage and said axle and prevent any pivotal motion therebetween, said fastener being threadable into said steerable axle to exert a clamping load on said split hub and effect a movement therebetween along said diagonal mating faces to securely fix said carrier linkage to said axle.

14. The Vehicle of claim 12 wherein said lock-out means further includes:

a tie rod interengaged between said opposing steerable wheels to effect simultaneous movement therebetween, said tie rod being a replacement for said connecting link means.

15. The vehicle of claim 11 wherein said lock-out means includes:

a bracket detachably connected to said carrier linkage and to said axle to prevent pivotal movement of said carrier linkage means associated with the lateral shifting of said steerable axle relative to said chassis.

* * * * *